United States Patent [19]
Higby et al.

[11] Patent Number: 5,641,716
[45] Date of Patent: *Jun. 24, 1997

[54] GLASS PRODUCTION METHOD USING ILMENITE

[75] Inventors: Paige L. Higby, Maumee; Bret E. Penrod, Toledo, both of Ohio; J. Joseph Cheng, Rochester, Minn.; Rodney G. Baker, Maumee, Ohio

[73] Assignee: Libbey-Owens-Ford Co., Toledo, Ohio

[ * ] Notice: The term of this patent shall not extend beyond the expiration date of Pat. No. 5,523,263.

[21] Appl. No.: 657,822

[22] Filed: May 31, 1996

Related U.S. Application Data

[63] Continuation of Ser. No. 296,875, Aug. 26, 1994, Pat. No. 5,523,263, which is a continuation of Ser. No. 169,645, Dec. 20, 1993, abandoned, which is a continuation of Ser. No. 53,603, Apr. 27, 1993, abandoned.

[51] Int. Cl.$^6$ ............................................. C03C 6/04
[52] U.S. Cl. ................................ 501/27; 501/31; 501/70
[58] Field of Search ................................ 501/27, 31, 70

[56] References Cited

U.S. PATENT DOCUMENTS

| | | | |
|---|---|---|---|
| 5,320,986 | 6/1994 | Taniguchi et al. | 501/70 |
| 5,344,798 | 9/1994 | Morimoto et al. | 501/70 |
| 5,362,689 | 11/1994 | Morimoto et al. | 501/70 |
| 5,364,820 | 11/1994 | Morimoto et al. | 501/71 |
| 5,380,685 | 1/1995 | Morimoto et al. | 501/71 |

FOREIGN PATENT DOCUMENTS 488110  6/1992  European Pat. Off. .

*Primary Examiner*—Mark L. Bell
*Assistant Examiner*—David Sample
*Attorney, Agent, or Firm*—Marshall & Melhorn

[57] ABSTRACT

A neutral, generally green colored, infrared energy and ultraviolet radiation absorbing glass composition comprises conventional soda-lime-silica float glass ingredients, a relatively high concentration of moderately reduced iron, and titanium oxide(s). The resultant glass exhibits an Illuminant A visible light transmittance of at least 70%, a total solar energy transmittance not greater than about 46%, and an ultraviolet radiation transmittance not greater than approximately 38%, at selected glass thicknesses in the range of 3 mm to 5 mm. The titanium oxide(s) as well as at least a portion of the iron in the glass is provided by the inclusion of the mineral ilmenite in the glass batch formulation.

4 Claims, No Drawings

GLASS PRODUCTION METHOD USING ILMENITE

RELATED APPLICATIONS

This application is a continuation of U.S. application Ser. No. 08/296,875, filed Aug. 26, 1994, now U.S. Pat. No. 5,523,263 which is a continuation of U.S. application Ser. No. 08/169,645, filed Dec. 20, 1993 now abandoned, which is a continuation of U.S. application Ser. No. 08/053,603, filed Apr. 27, 1993 now abandoned.

FIELD OF THE INVENTION

The present invention is directed to ultraviolet and infrared radiation absorbing soda-lime-silica glass compositions containing oxides of iron and titanium, and to the methods of making the compositions and forming glass articles therefrom. More particularly, the invention concerns neutral, generally green colored glass compositions having a particular combination of energy absorption and light transmittance properties. The preferred glass has a narrowly defined dominant wavelength and color purity. The present invention is particularly useful for producing automotive and architectural glazings, wherein high visible light transmittances and low total solar energy and ultraviolet radiation transmittances are desired.

BACKGROUND OF THE INVENTION

It is generally known to manufacture heat or infrared radiation absorbing soda-lime-silica glass by the incorporation therein of iron. The iron is generally present in the glass as both ferrous oxide (FeO) and ferric oxide ($Fe_2O_3$). The balance between ferrous and ferric oxide has a direct and material effect on the color and transmittance properties of the glass. As the ferrous oxide content is increased (as a result of chemically reducing ferric oxide), the infrared absorption increases and the ultraviolet absorption decreases. The shift toward a higher concentration of FeO in relation to the $Fe_2O_3$ also causes a change in the color of the glass from a yellow or yellow-green to a darker green or blue-green, which reduces the visible transmittance of the glass. Therefore, in order to obtain greater infrared absorption in glass without sacrificing visual transmittance, it has been deemed necessary in the prior art to produce glass with a low total iron content which is highly reduced from $Fe_2O_3$ to FeO.

U.S. Pat. No. 2,860,059 discloses an ultraviolet absorbing glass composition, having a low total iron concentration, which is described as superior in visible light transmittance to the greenish-blue glasses generally used in automotive and architectural glazings. The maximum iron content is 0.6% by weight, in order for the glass to maintain its colorless appearance and high visible light transmittance. Titanium dioxide, and up to 0.5% by weight ceramic oxide, are added to the glass for the purpose of providing ultraviolet radiation absorption.

U.S. Pat. No. 1,936,231 discloses a colorless glass, wherein ferric oxide is added as an ultraviolet radiation cut-off agent in quantities so small that the resultant glass retains its high visible light transmittance. The suggested total iron content is approximately 0.35% by weight. The patent further discloses that cerium compounds may be added, as ultraviolet radiation cut-off agents, to low total iron containing glass compositions. Thus, the resultant glass compositions retain their colorless appearance and high visible light transmittance properties.

U.S. Pat. No. 4,792,536 discloses a process for producing an infrared energy absorbing glass, containing a total iron concentration which is highly reduced to FE. It is further disclosed that the infrared energy absorption can be increased by including greater mounts of total iron in the glass composition, but states that the visible light transmittance would thereby be reduced below levels considered adequate for automotive glazings. The disclosed process utilizes a two stage melting and refining operation, which provides highly reducing conditions so as to increase the amount of iron in the ferrous state for a given total iron concentration of from 0.45% to 0.65% by weight. The patent teaches that the iron must be at least 35% reduced to FeO. Most preferably, greater than 50% of the total iron content must be reduced to the ferrous state. It is further disclosed that 0.25% to 0.5% by weight of ceric oxide may be added to low total concentration, highly reduced iron containing glass compositions, for the purpose of absorbing ultraviolet radiation, as well as quantities of $TiO_2$, $V_2O_5$ and $MoO_3$.

U.S. Pat. No. 5,077,133 discloses a green-colored heat absorbing glass which contains cerium oxide as an ultraviolet radiation absorbing component. In accordance with an alternative embodiment of this patent, a portion of the cerium oxide content may be replaced with a quantity of $TiO_2$. The glass composition contains a relatively high total iron content, i.e., in the range of 0.7 to about 1.25 percent by weight.

SUMMARY OF THE INVENTION

In accordance with the present invention, a neutral, generally green colored glass composition, having an Illuminant A visible light transmittance value of at least 70%, a total solar energy transmittance not greater than about 46%, and an ultraviolet radiation transmittance not greater than about 38% and preferably not greater than approximately 36%, at glass thicknesses from about 3 mm to 5 mm, is provided.* The composition comprises a soda-lime-silica base glass and includes as essential ingredients colorants of from about 0.4 to 0.9 weight percent $Fe_2O_3$, 0.1 to 0.5 weight percent FeO, and 0.25 to 1.25 weight percent $TiO_2$. These glasses have an Illuminant C dominant wavelength from about 495 to 535 nanometers and a color purity from about 2% to 5%. They are produced from batch compositions having a total iron concentration, expressed as $Fe_2O_3$, above about 0.45 percent. In this connection, it is common in the glass industry to refer to the total iron contained in a glass composition or batch as "total iron expressed as $Fe_2O_3$". When a glass batch is melted, however, some of this amount of total iron is reduced to FeO, while the rest remains $Fe_2O_3$. The balance between ferrous and ferric oxides in the melt is a result of the oxidation-reduction equilibrium and is expressed herein and in the appended claims as the "ferrous value". Reduction of $Fe_2O_3$ produces not only FeO, but oxygen gas as well, thus decreasing the combined weight of the two iron compounds in the resultant glass product. Consequently, the combined weight of the actual FeO and $Fe_2O_3$ contained in a resulting glass composition will be less than the batch weight of the total iron expressed as $Fe_2O_3$. For this reason, it shall be understood that "total iron" or "total iron expressed as $Fe_2O_3$", as used herein and in the appended claims, means the total weight of iron contained in the glass batch before reduction. It should further be understood that "ferrous value", as used herein and in the appended claims, is defined as the weight percent ferrous oxide in the resultant glass divided by the weight percent of total iron express as $Fe_2O_3$.

* It should be understood that by this recitation of glass thickness is meant total glass thickness, and the glazing unit comprising same may be composed of a single glass sheet or two or more glass sheets, the total thickness of which is in the indicated range. Also, radiation transmittance values disclosed herein are based upon the following wavelength ranges:

| | |
|---|---|
| Ultraviolet | 300–400 nanometers |
| Visible | 400–770 nanometers |
| Total Solar | 300–2130 nanometers |

The glass compositions of the present invention are particularly suited for the production of infrared energy and ultraviolet radiation absorbing glass, for automotive and architectural glazings. Thus, glass sheets of this composition may be heat strengthened or tempered, or alternately annealed and laminated together through an interposed transparent resinous layer, for example composed of polyvinyl butyral, and employed, for example, as a windshield. Generally, the glass sheets for windshield use are of a thickness in the range of from about 1.7 mm to about 2.5 mm, while those tempered and used as sidelights or backlights are in the range of about 3 mm to about 5 mm thick.

Unless otherwise noted, the term percent (%) as used herein and in the appended claims, means percent (%) by weight. Wavelength dispersive X-ray fluorescence was used to determine the weight percents of $TiO_2$ and total iron expressed as $Fe_2O_3$. Percent reduction of total iron was determined by first measuring the radiant transmission of a sample at a wavelength of 1060 nanometers, using a spectrophotometer. The 1060 nm transmission value was then used to calculate optical density, using the following formula:

$$\text{Optical density} = \text{Log}_{10} \frac{T_o}{T} \quad \begin{array}{l}(T_o = 100 \text{ minus estimated loss from} \\ \text{reflection} = 92; T = \text{transmission at} \\ 1060 \text{ nm}).\end{array}$$

The optical density was then used to calculate the percent reduction:

percent reduction =

$$\frac{(110) \times (\text{optical density})}{(\text{Glass thickness in mm}) \times (\text{wt \% total Fe}_2\text{O}_3)}$$

DETAILED DESCRIPTION OF THE PREFERRED EMBODIMENT

For use as an automotive windshield, infrared energy and ultraviolet radiation absorbing glass must meet federal specifications which require an Illuminant A visible light transmittance greater than 70%. The thinner glasses used in modern automobiles have made it easier to achieve the 70% Illuminant A standard, but have also resulted in increased infrared energy and ultraviolet radiation transmittances. Consequently, automobile manufacturers have been forced to compensate for greater heat loads by appropriately sizing air conditioning equipment, and are compelled to include more ultraviolet radiation stabilizers in fabrics and interior plastic components in order to prevent their degradation.

The glass compositions of the present invention, when fabricated to a total glass thickness of about 3 mm to 5 mm, will exhibit an Illuminant A visible light transmittance value of at least 70%, and provide very desirable combined infrared energy and ultraviolet radiation transmittance values. The total solar energy transmittance of the compositions of the present invention, at selected glass thicknesses in the range of 3 mm to 5 mm, is not greater than about 46%. Preferably, the total solar energy transmittance in these thicknesses is not greater than about 45%. Total solar energy transmittance is a measure of the solar energy transmittance over all solar energy wavelengths. It is an integrated term covering the area under the transmittance versus wavelength curve for visible, infrared and ultraviolet energy wavelengths. The ultraviolet radiation transmittance of the compositions of the present invention is not greater than about 38%, at selected glass thicknesses in the range of 3 mm to 5 mm, and generally not greater than about 36%. The ultraviolet radiation transmittance value is an integrated term representing the area under the transmittance versus wavelength curve for wavelengths between 300 and 400 nanometers. It will of course be understood by those skilled in the art that the particular composition within the before mentioned compositional ranges of the invention will be tailored to produce the above desired properties at the particular desired thickness.

Suitable batch materials according to the present invention, which are compounded by conventional glass batch ingredient mixing devices, include sand, limestone, dolomite, soda ash, salt cake or gypsum, rouge, carbon, and a titanium compound such as titanium dioxide. In this connection, and in accordance with an important embodiment of this invention, it has surprisingly been discovered that the use of ilmenite as the source of titanium is particularly advantageous, supplying at least a partial amount of the $Fe_2O_3$ as well as titanium dioxide. These batch materials are conveniently melted together in a conventional glass making furnace, to form a neutral, generally green colored infrared energy and ultraviolet radiation absorbing glass composition, which thereafter may be continuously cast onto the molten metal bath in a float glass process. The flat glass thus produced may be formed into architectural glazings, or cut and formed, such as for example by press bending, into automotive glazings.

As above noted, the mineral ilmenite, iron titanium trioxide ($FeTiO_3$), has several advantages as a glass batch ingredient over pigment grade titania (titanium dioxide $TiO_2$). Thus, with regard particularly to handling, ilmenite naturally occurs as detrital sand size grains while titania is an expensive, man made, fine powder. Grains of ilmenite freely flow in response to gravity and generally have the same angle of repose as quartz sand. Since the particle size of ilmenite is within the same particle size range as the other glass batch ingredients, it homogenizes well in the wet batch mixer and does not segregate. Fine titania powders do not flow freely due to cohesive molecular attractions such as van der Waals force. Segregation and homogenization are problems that occur due to the extreme particle size difference between the titania powder and the glass batch ingredients. Fine powders are more difficult to weigh and transfer in the scale house, resulting in chemical variation of the glass. Poor blending results in glass quality problems and increases the chemical variation of the glass.

In addition, the use of ilmenite is advantageous from melting and chemistry standpoints. The ilmenite grains are black, absorbing heat and readily going into solution in the glass melt. The titania powder is white, heat reflecting, and therefore requires additional energy to go into solution. The titania powder, if agglomerated due to poor mixing or flow problems, would be even more difficult to melt.

The presence of oxides in the reduced state improve the stability of the melt and have been correlated with good glass quality. Ilmenite typically contains up to 50% FeO, aiding in the reduction of the glass melt, and controlling the optical properties of the glass. Currently, carbon is used to control the oxidation state of the glass. Ilmenite improves the control of the oxidation state because of much greater stabilities at higher temperatures. The carbon is converted into carbon dioxide while the iron and titanium present in the ilmenite are directly transferred into the glass without any volatilization.

The composition of the melted and cast soda-lime-silica glass in accordance with the invention comprises:

A) from about 65 to about 80 weight percent $SiO_2$;

B) from about 10 from about 20 weight percent $Na_2O$;

C) from 0 to about 10 weight percent $K_2O$;

D) from about 1 to about 10 weight percent MgO;

E) from about 5 to about 15 weight percent CaO;

F) from 0 to about 5 weight percent $Al_2O_3$;

G) from 0 to about 5 weight percent BaO;

H) from about 0.4 to about 0.9 weight percent $Fe_2O_3$;

I) from about 0.1 to about 0.5 weight percent FeO, with this percent FeO representing a percent reduction of total iron in the batch of from about 19% to no more than 50% (ferrous value); and J) about 0.25 to about 1.25 weight percent $TiO_2$.

Preferably, the resultant glass composition consists essentially of:

A) from about 70 to about 74 weight percent $SiO_2$;

B) from about 12 to about 14 weight percent $Na_2O$;

C) from 0 to about 1 weight percent $K_{2o}$;

D) from about 3 to about 4 weight percent MgO;

E) from about 6 to about 10 weight percent CaO;

F) from 0 to about 2 weight percent $Al_2O_3$;

G) from about 0.45 to about 0.9 weight percent $Fe_2O_3$;

H) from about 0.1 to about 0.3 weight percent FeO, with this percent FeO representing a percent reduction of total iron in the batch of from about 20% to no more than 29% (ferrous value); and I) from about 0.25 to about 1 weight percent $TiO_2$, the glass being devoid of further constituents other than perhaps traces of residual melting aids and/or impurities which have no affect on the properties of the glass. For a nominal glass thickness of 4 mm, the $Fe_2O_3$ content of this glass would be from about 0.6 to about 0.9 weight percent.

Silica forms the glass matrix. Sodium oxide, potassium oxide, magnesium oxide, and calcium oxide act as fluxes to reduce the melting temperature of the glass. Alumina regulates the viscosity of the glass, and prevents diversification. Moreover, the magnesium oxide, calcium oxide, and alumina act together to improve the durability of the glass. Salt cake or gypsum acts as a refining agent, while carbon is a known reducing agent.

Iron is added, typically as rouge or $Fe_2O_3$, but preferably at least in part as ilmenite, and is partially reduced to FeO. The total amount of iron in the batch is critical, and must equal from about 0.45% to about 1% by weight, preferably from about 0.6 to 1.0% by weight, expressed as $Fe_2O_3$. Likewise, the degree of reduction or ferrous value is important and should equal between 19% and 50%, preferably between 20% and 29%. The aforementioned ranges, for total iron and the degree of reduction from ferric to ferrous iron, result in concentrations from about 0.4 to about 0.9 weight percent $Fe_2O_3$ and from about 0.1 to about 0.5 weight percent FeO in the glass. If the iron is more highly reduced than the recited amount, the glass will become too dark and the Illuminant A visible light transmittance will drop below 70%. Additionally, the glass batch melting process will become increasingly difficult as the increased amount of FeO prevents the penetration of heat to the interior of the melt. If the iron is less reduced than the recited amount, or if a lower total amount of iron is employed, then the total solar energy transmittance for a desired thickness glass can rise above about 46%. Finally, if an amount of total iron higher than the recited amount is used, less heat will be able to penetrate the interior of the melt, and the batch melting process will become increasingly more difficult.

Moreover, the concentration of the titanium oxide ultraviolet radiation absorber, in concert with the iron, is critical to the balance of transmittance properties. The titanium oxide must be present at a concentration from about 0.25% to about 1.25% by weight, preferably from about 0.25% to about 1.0%, and most preferably from about 0.4 to about 0.9%. A higher concentration of titanium oxide would cause a shift of color toward yellow-green, and eventually to a commercially unacceptable color. A lower concentration of titanium oxide would make the ultraviolet radiation transmittance unacceptably high.

As can be seen, the synergistic effect of the critical concentration limits for the iron and titanium oxide, and the desired degree of reduction of $Fe_2O_3$ to FeO, is to produce a neutral, generally green colored glass composition having an Illuminant A visible light transmittance greater than 70%, a total solar energy transmittance not greater than about 46%, and an ultraviolet radiation transmittance of not greater than about 38%, preferably less than about 36%.

Moreover, the glass of the present invention is characterized by an Illuminant C dominant wavelength from about 498 to about 535 nanometers, and displays a color purity from about 2% to about 5%, and most always from 2% to 4%. The purity of an automotive vision glazing is an important parameter, and should be maintained at as low a level as practicable. Blue glass, by comparison, has a purity of up to about 10%, and therefore is less desirable as an automotive vision glazing. Expressed in different parameters, the glass in accordance with this invention must have a color defined by the CIELAB system as follows: $a^*=-10\pm10$; $b^*=4\pm5$; and $L=89\pm10$. Preferably, the glass displays values of: $a^*=-8\pm4$; $b^*=2+3/-2$; $L=89\pm2$.

EXAMPLES 1–7

Typical soda-lime-silica glass batch ingredients were mixed, together with rouge, a carbonaceous reducing agent, and a titanium compound, for example ilmenite, and melted to produce 4 mm thick test samples in accordance with the invention. The resultant glass samples are characterized as follows:

|  | Glass Properties at 4 mm | | | | | | |
| --- | --- | --- | --- | --- | --- | --- | --- |
|  | Ex. 1 | Ex. 2 | Ex. 3 | Ex. 4 | Ex. 5 | Ex. 6 | Ex. 7 |
| Total Iron, as $Fe_2O_3$ (%) | 0.48 | 0.846 | 0.836 | 0.767 | 0.9 | 0.81 | 0.681 |
| Reduction of Iron to FeO (%) (Ferrous Value) | 47.9 | 26.0 | 26.5 | 27.6 | 21.4 | 26.0 | 31.5 |
| $Fe_2O_3$ (%) | 0.25 | 0.626 | 0.614 | 0.555 | 0.708 | 0.6 | 0.482 |
| FeO (%) | 0.207 | 0.198 | 0.199 | 0.191 | 0.173 | 0.190 | 0.193 |
| $TiO_2$ (%) | 0.96 | 0.45 | 0.823 | 0.654 | 0.65 | 0.65 | 0.7 |
| Illuminant A (%) Transmittance | 71.3 | 71.2 | 70.3 | 71.9 | 70.9 | 71.3 | 71.7 |
| Total Solar Transmittance (%) | 42.6 | 43.3 | 42.5 | 44.3 | 45.2 | 43.8 | 43.8 |
| UV Transmittance (%) | 36.8 | 36.0 | 32.0 | 34.3 | 34.3 | 31.8 | 34.6 |
| Dominant Wavelength (nm) | 527.3 | 509.6 | 532.9 | 524.4 | 531.7 | 533.6 | 527.9 |
| Color Purity (%) | 3.1 | 2.76 | 3.6 | 2.8 | 3.58 | 3.4 | 3.7 |
| L* | 88.29 | 88.25 | 87.78 | 88.57 | 87.08 | 88.32 | 88.46 |
| a* | −9.85 | −9.89 | −9.95 | −9.15 | −10.2 | −9.31 | −9.42 |
| b* | 4.51 | 2.74 | 5.01 | 3.96 | 5.03 | 4.74 | 4.34 |

The complete composition of the glass of Example 4 is as follows (weight percent): $SiO_2$-73.0; $Na_2O$-13.9; CaO-7.8; MgO-3.4; $Fe_2O_3$-0.767; $TiO_2$-0.654; $Al_2O_3$-0.345; and $K_2O$-0.08.

The batch composition for the glass of Example 7 comprised (parts by weight); Sand-145; Limestone-11; Dolomite-33; Soda Ash-50; Gypsum-1; Rouge-67; Ilmenite-2.25; and Carbon-.05. The resulting complete glass composition is as follows (weight percent): $SiO_2$-73.25; $Fe_2O_3$-0.697; $Al_2O_3$-0.168; $TiO_2$-0.70; CaO-7.786; $M_gO$-3.44; $Na_2O$-13.92; and $K_2O$-0.038.

This description of the invention has been made with reference to specific examples, but it should be understood that variations and modifications as are known to those of skill in the art may be resorted to without departing from the scope of the invention as defined by the claims that follow.

What is claimed is:

1. In a process for producing a neutral colored ultraviolet radiation absorbing glass, including admixing, heating and melting a soda-lime-silica float glass batch mixture comprising sand, soda ash, dolomite, limestone, a sulfate selected from the group consisting of salt cake and gypsum, a source of iron oxide and a source of titanium oxide, the improvement comprising including in said batch ilmenite as at least a partial source of the oxides of iron and titanium in the resulting glass, said resulting glass containing from about 0.4 to about 0.9 weight percent $Fe_2O_3$, from about 0.1 to about 0.5 weight percent FeO, and from about 0.25 to 1.25 weight percent $TiO_2$.

2. A process as defined in claim 1, wherein said resulting glass has a color defined by the following CIELAB values: a*=−10±10; b*=4±5; L=89±10.

3. A process as defined in claim 1, wherein said resulting glass includes from about 0.6 to about 0.9 weight percent $Fe_2O_3$, from about 0.1 to about 0.3 weight percent FeO, and from about 0.4 to about 0.9 weight percent $TiO_2$.

4. A process as defined in claim 1, wherein said resulting glass has an Illuminant A visible light transmittance greater than 70%, a total solar energy transmittance no more than about 46%, and an ultraviolet radiation transmittance no more than about 38% at selected nominal glass thicknesses from about 3 mm to about 5 mm.

* * * * *

UNITED STATES PATENT AND TRADEMARK OFFICE
CERTIFICATE OF CORRECTION

PATENT NO. : 5,641,716
DATED : JUNE 24, 1997
INVENTOR(S) : HIGBY ET AL.

It is certified that error appears in the above-identified patent and that said Letters Patent is hereby corrected as shown below:

COLUMN 2, LINE 3, CHANGE "FE" TO —FeO—.
COLUMN 2, LINE 5, CHANGE "mounts" TO —amounts—.
COLUMN 5, LINE 28, CHANGE "$K_{20}$" TO —$K_2O$—.
COLUMN 5, LINE 48, CHANGE "diversification" TO —divitrification—.
COLUMN 7, LINE IN CHART STARTING WITH A*, CHANGE "-9.89" TO —-9.39—.
COLUMN 7, LINE 29, CHANGE "$SiO_2\_73.0$" TO —$SiO_2$ -73.0—.

Signed and Sealed this

Twenty-sixth Day of January, 1999

Attest:

Attesting Officer

*Acting Commissioner of Patents and Trademarks*